No. 797,760. PATENTED AUG. 22, 1905.
H. H. SUTRO & L. M. BOOTH.
APPARATUS FOR SOFTENING AND PURIFYING WATER.
APPLICATION FILED MAY 7, 1904.

2 SHEETS—SHEET 2.

Witnesses
Egbert V. Nelson
E. Dunin

Harry Herbert Sutro   Inventors
Lewis Miller Booth
By their Attorney Henry M. Brigham

UNITED STATES PATENT OFFICE.

HARRY HERBERT SUTRO, OF NEW YORK, N. Y., AND LEVIS MILLER BOOTH, OF PLAINFIELD, NEW JERSEY.

APPARATUS FOR SOFTENING AND PURIFYING WATER.

No. 797,760.  Specification of Letters Patent.  Patented Aug. 22, 1905.

Application filed May 7, 1904. Serial No. 206,869.

*To all whom it may concern:*

Be it known that we, HARRY HERBERT SUTRO, a resident of the borough of Manhattan, in the city and State of New York, and LEVIS MILLER BOOTH, a resident of Plainfield, in the county of Union and State of New Jersey, citizens of the United States, have invented certain new and useful Improvements in Apparatus for Softening and Purifying Water, of which the following is a specification.

The object of our invention is to provide a simple and effective apparatus for softening and purifying water which shall have a large capacity, a small ground area, and which shall deliver treated water at a considerable height above the foundation of the apparatus.

The particular features of our invention are pointed out in the appended claims.

Figure 1:
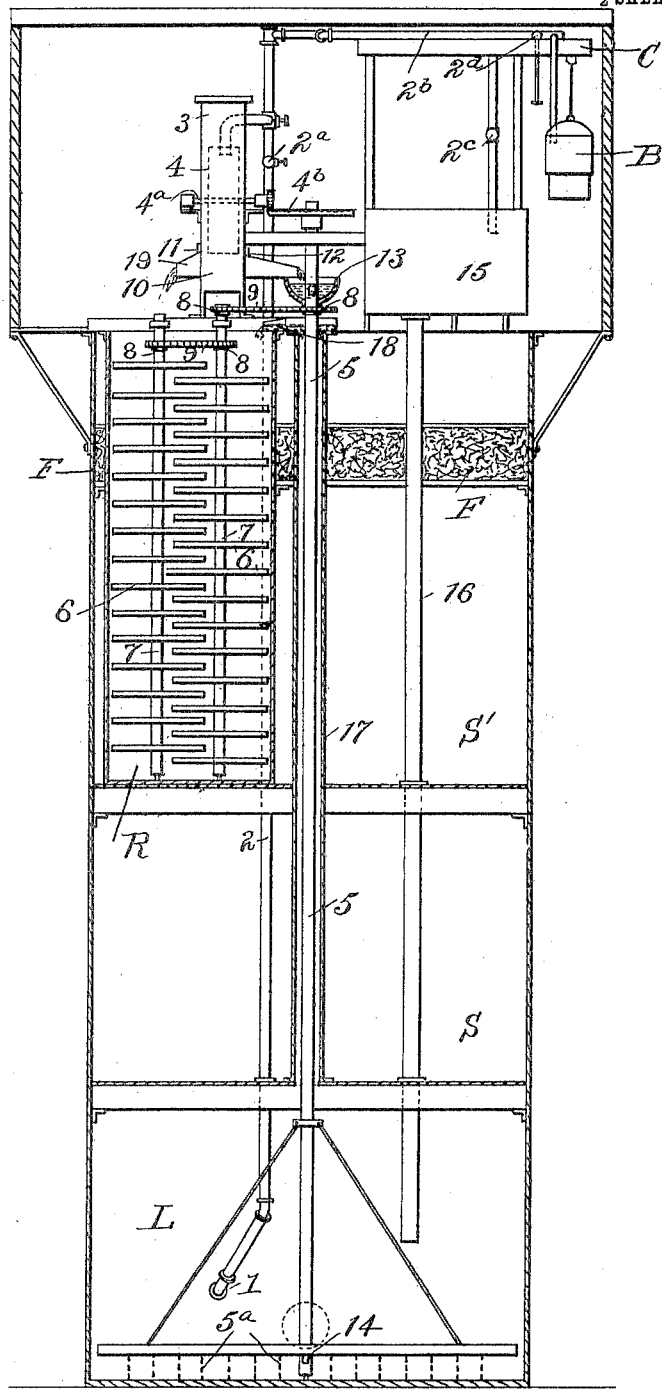
Figure 2:
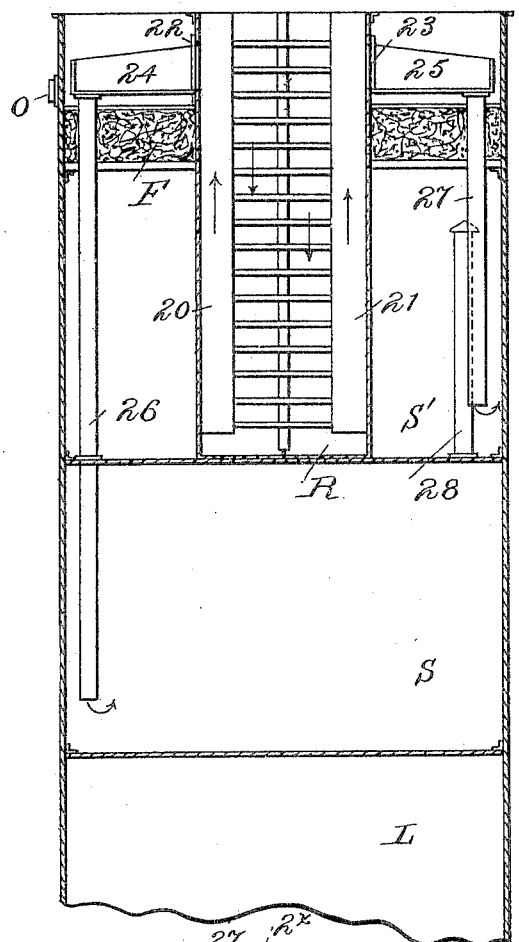
Figure 3:
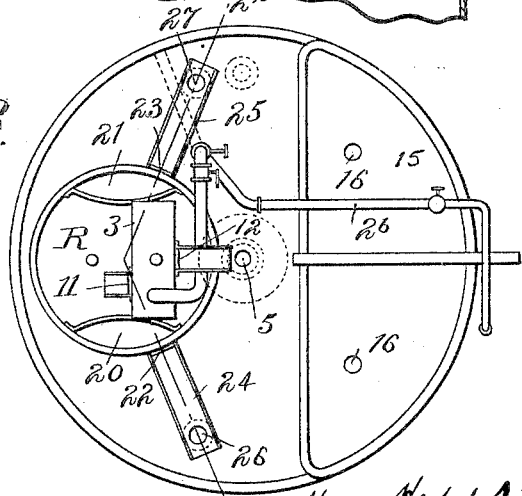

In the accompanying drawings, Figure 1 is a vertical section of the improved apparatus. Fig. 2 is a vertical section through the several tanks on the irregular line $2^x\ 2^x$, Fig. 3. Fig. 3 is a diagrammatic plan.

1 indicates the inlet for raw water, 2 a pipe leading upward therefrom controlled by suitable valve $2^a$ and delivering the water to a box 3, containing an overshot water-wheel 4.

5 is a hollow vertical shaft carrying scrapers $5^a$ at the bottom of the lime-tank L and rotated from shaft $4^a$ of the water-wheel by means of bevel-gearing $4^b$. The hollow shaft 5 also serves as a pipe to convey raw water to the lime-tank L.

S and S' indicate superposed settling tanks or reservoirs, in the upper one of which is a reaction-tank R, containing agitating-arms 6 6, carried by vertical shafts 7 7.

8 8 8 8 indicate sprocket-wheels, and 9 9 chains by means of which the shafts 7 are driven from the shaft 5.

11 and 12 indicate gates dividing the flow of water from the lower part 10 of the wheel-box 3.

13 indicates a bowl on the pipe-shaft 5 to receive water from the gate 12 and deliver it to the interior of said pipe-shaft, from which it emerges by an aperture 14 at bottom within the lime-tank L.

15 indicates a vat in which lime is slaked and converted into milk of lime, and 16 a pipe to convey the milk of lime to the lime-tank L.

17 indicates a pipe surrounding the pipe-shaft 5, designed to discharge lime-water from the top of the lime-tank L, and 18 a chute or spout conveying water from the top of the pipe 17 to the top of the reaction-tank R, where it mingles with the raw water flowing from the wheel-box 3 10 through the gate 11.

20 and 21 indicate ducts for conveying the treated water from the bottom of the reaction-tank R, and 24 25 chutes carrying it to pipes 26 27, which deliver it near the bottom of the respective settling-tanks S S' in proper proportions regulated by the gates 22 23.

28 indicates a pipe delivering water from the lower settling-tank S into the upper part of the upper settling-tank S', and F a filter through which the purified water passes to the outlet O. A suitable pipe $2^b$, controlled by valves $2^c\ 2^d$, supplies water to the vat 15 for slaking the lime and to the hoisting-bucket B, which is used for hoisting lime and chemicals, and C is a hoisting-crane.

Operation: The water enters the inlet at 1, flows upward to the wheel-box 3 through the piping 2. The fall of water is utilized to drive the water-wheel 4. This actuates the main stirring-shaft 5 by means of beveled gearing. Motion to drive the reaction-tank stirrers 6 6 is communicated to the agitator-shafts 7 7 by means of sprocket-wheels 8 and chains 9.

After having passed from the water-wheel 4 the water leaving the compartment 10 in the wheel-box 3 is divided into two streams by the gates 11 and 12, respectively. The portion flowing from 12 passes into the bowl 13 and down the pipe-shaft 5 to the bottom of the lime-tank, where it emerges at the point 14. Here the water meets the milk of lime which has previously been slaked in the lime-vat 15. After being slaked the lime is dropped to the bottom of the lime-tank through the pipe 16. After the water has dissolved a sufficiency of slaked lime it flows upward around the pipe-shaft 5 in the sleeve 17 and overflows at 18 into the reaction-tank. Here it meets the rest of the water which flows from the gate 11 by the way of the chute 19. The water with reagent solutions flows downward in the reaction-tank, being stirred continuously by the agitator-bars 6 6 on the shafts 7 7, thence upward through the ducts 20 and 21, through the respective gates 22 and 23 and the chutes 24 and 25 and the pipes 26 and 27. The amounts of water flowing through the pipes 26 and 27 are governed by the gates 22 and 23, so that each pipe shall convey to its respective settling-tank an amount of water proportional to the area available for settling purposes in each of the tanks. This is necessitated by the fact that the area occupied by the reaction-tank is subtracted from the upper settling-tank only. From the bottom of the pipe 26 the water flows across the lower settling-tank, depositing its precipitate, and emerges by the pipe 28. From this it passes through the filter and to the outlet. The water passing from the pipe 27 flows across the upper settling-tank through the filter to the outlet.

The particular advantage in this type of machine over that which contains but one settling-tank is that it may be built of relatively small diameter without sacrificing the settling area and that when desirable additional height is gained, thereby permitting the treated water to be discharged from the outlet at a point higher than would be possible under different circumstances, except by raising the whole machine by locating it on an elevated structure.

Having thus described the invention, the following is what we claim as new therein and desire to secure by Letters Patent:

1. In an apparatus for softening and purifying water, the combination of a lime-water tank, a reaction-tank having means for agitating the water while under chemical treatment, a plurality of superposed settling-tanks, means for supplying raw water to the lime-water tank, and the reaction-tank, means for supplying milk of lime to the lime-water tank, means for conveying lime-water from the upper part of the lime-water tank to the reaction-tank, separate conduits delivering treated water from the reaction-tank to the lower part of the respective settling-tanks, and means for discharging purified water from the upper part of the settling-tanks, substantially as described.

2. In an apparatus for softening and purifying water, the combination of a lime-water tank, a reaction-tank having means for agitating the water while under chemical treatment, a plurality of superposed settling-tanks in one of which the reaction-tank is contained, means for supplying raw water to the lime-water tank and the reaction-tank, means for supplying milk of lime to the lime-water tank, means for conveying lime-water from the upper part of the lime-water tank to the reaction-tank, separate conduits delivering treated water from the reaction-tank to the lower part of the respective settling-tanks and means for discharging purified water from the upper part of the settling-tanks, substantially as described.

3. In an apparatus for softening and purifying water, the combination of a lime-water tank, a reaction-tank having means for agitating the water while under chemical treatment, a plurality of superposed settling-tanks, means for supplying raw water to the lime-water tank, and the reaction-tank, means for supplying milk of lime to the lime-water tank, means for conveying lime-water from the upper part of the lime-water tank to the reaction-tank, separate conduits delivering treated water from the reaction-tank to the lower part of the respective settling-tanks, a conduit delivering treated water from the upper part of one settling-tank to the other settling-tank, and means for discharging purified water from the upper part of the settling-tank, substantially as described.

4. In an apparatus for softening and purifying water, the combination of three superposed tanks, one being a lime-water tank and the other two settling-tanks for treated water, a reaction-tank contained in one of the superposed tanks, means for supplying separate streams of raw water to the lime-water tank and to the reaction-tank, means for supplying milk of lime to the lime-water tank, conduits delivering lime-water from the upper part of the lime-water tank to the reaction-tank, treated water from the reaction-tank to the respective settling-tanks, and purified water from the upper part of the lower settling-tank to the upper settling-tank, and means for discharging purified water from the upper part of the upper settling-tank, substantially as described.

5. In an apparatus for softening and purifying water, the combination of three superposed tanks, one being a lime-water tank and the other two settling-tanks for treated water, a reaction-tank contained in one of the superposed tanks, means for supplying separate streams of raw water to the lime-water tank and to the reaction-tank, means for supplying milk of lime to the lime-water tank, conduits delivering lime-water from the upper part of the lime-water tank to the reaction-tank, treated water from the reaction-tank in regulated proportions to the respective settling-tanks and purified water from the upper part of the lower settling-tank to the upper settling-tank and means for discharging purified water from the upper part of the upper settling-tank, substantially as described.

6. In an apparatus for softening and purifying water, the combination of the lime-water tank L, superposed settling-tanks S, S', the reaction-tank R contained in the upper settling-tank and having a mechanical agitator 6, 7, means for supplying raw water in separate regulated streams to the lime-water tank and to the reaction-tank, means for supplying milk of lime to the lime-water tank, a conduit 17, 18, delivering lime-water from the top of the lime-water tank to the reaction-tank, the conduits 20, 24, 26, and 21, 25, 27, and gates 22, 23, delivering treated water in regulated proportions from the reaction-tank to the respective settling-tanks, a conduit 28 delivering treated water from the top of the lower settling-tank to the upper part of the upper settling-tank, and a filter F at top of the upper settling-tank through which purified water is delivered for use, substantially as described.

7. In an apparatus for softening and purifying water, the combination of the lime-water tank L, superposed settling-tanks S, S', the reaction-tank R contained in the upper settling-tank and having a mechanical agitator 6, 7, means for supplying raw water in separate regulated streams to the lime-water tank and to the reaction-tank, the pipe-shaft 5 through which the raw water is conveyed to the bottom of the lime-water tank, and carrying a stirrer $5^a$ on its lower end, suitable means for imparting rotation to the shafts 5 and 7, means for supplying milk of lime to the lime-water tank, a conduit 17, 18, delivering lime-water from the top of the lime-water tank to the reaction-tank, the conduits 20, 24, 26, and 21, 25, 27, and gates 22, 23 delivering treated water in regulated proportions from the reaction-tank to the respective settling-tanks, a conduit 28 delivering treated water from the top of the lower settling-tank to the upper part of the upper settling-tank, and a filter F at top of the upper settling-tank through which purified water is delivered for use, substantially as described.

8. In an apparatus for softening and purifying water, the combination of the lime-water tank L, superposed settling-tanks S, S', the reaction-tank R contained in the upper settling-tank and having a mechanical agitator 6, 7, means for supplying raw water in separate regulated streams to the lime-water tank and to the reaction-tank, the pipe-shaft 5 through which raw water is conveyed to the bottom of the lime-water tank, and carrying a stirrer $5^a$ on its lower end, the water-supply 2 and the water-wheel 4 in the upper part of the apparatus, suitable connections for driving the shafts 5 and 7 by power from said water-wheel, means for supplying milk of lime to the lime-water tank, the conduits 17, 18, delivering lime-water from the top of the lime-water tank to the reaction-tank, the conduits 20, 24, 26, and 21, 25, 27, and gates 22, 23, delivering treated water in regulated proportions from the reaction-tank to the respective settling-tanks, a conduit 28 delivering purified water from the top of the lower settling-tank to the upper part of the upper settling-tank, and a filter F at the top of the upper settling-tank through which purified water is delivered for use, substantially as described.

9. In an apparatus for softening and purifying water, the combination of a lime-water tank, a reaction-tank, a plurality of superposed settling-tanks, means for supplying raw water to the lime-water tank and the reaction-tank, means for conveying lime-water from the upper part of the lime-water tank to the reaction-tank, separate conduits delivering treated water from the reaction to the lower part of the respective settling-tanks and means for discharging purified water from the upper part of the settling-tanks, substantially as described.

10. In an apparatus for softening and purifying water the combination of a lime-water tank, a reaction-tank, a plurality of superposed settling-tanks, means for supplying raw water to the lime-water tank and to the reaction-tank means for conveying lime-water from the lime-water tank to the reaction-tank, separate conduits for delivering treated water from the reaction-tank to the lower part of the respective settling-tanks and means for conducting purified water from the upper part of the lower settling tank or tanks to the upper part of the upper settling-tank, and means for discharging purified water from the upper part of the upper settling-tank, substantially as described.

11. In an apparatus for softening and purifying water, the combination of a lime-water tank a reaction-tank a plurality of superposed settling-tanks, means for supplying lime to the lime-water tank, means for supplying lime-water and raw water to the reaction-tank, means for delivering treated water from the reaction-tank to the lower part of the respective settling-tanks and means for discharging treated water from the upper part of the settling-tanks, substantially as described.

12. In an apparatus for softening and purifying water, the combination of a reagent-tank a reaction-tank, a plurality of superposed settling-tanks, means for conducting the reagent and raw water to the reaction-tank and means for conducting treated water from the reaction-tank to the lower part of the settling-tanks, substantially as described.

Signed in the city of New York, in the county and State of New York, this 27th day of April, 1904.

HARRY HERBERT SUTRO.
LEVIS MILLER BOOTH.

Witnesses:
EGBERT V. NELSON,
E. QUINN.